United States Patent
Kondo et al.

[11] Patent Number: 5,922,787
[45] Date of Patent: Jul. 13, 1999

[54] COMPOSITION FOR FORMING ANTIFOULING ANTIFOULING FILM, OPTICAL COMPONENT, AND DISPLAY DEVICE

[75] Inventors: Hirofumi Kondo, Miyagi; Hideaki Hanaoka; Tomio Kobayashi, both of Kanagawa, all of Japan

[73] Assignee: Sony Corporation, Tokyo, Japan

[21] Appl. No.: 08/820,579

[22] Filed: Mar. 19, 1997

[30] Foreign Application Priority Data

Mar. 21, 1996 [JP] Japan ..................... 8-064089

[51] Int. Cl.⁶ ....................................... C08K 5/24
[52] U.S. Cl. .................... 523/122; 106/18.35; 428/40.7; 524/263
[58] Field of Search ................ 524/263; 556/431, 556/440, 436; 428/40.7; 106/18.35; 523/122

[56] References Cited

U.S. PATENT DOCUMENTS

| | | | |
|---|---|---|---|
| 3,132,117 | 5/1964 | Schmidt | 260/46.5 |
| 3,794,672 | 2/1974 | Kim | 556/440 |
| 3,798,251 | 3/1974 | Meiller | 556/440 |
| 3,809,783 | 5/1974 | Pittman et al. | 556/440 |
| 4,338,454 | 7/1982 | Wesson et al. | 106/18.35 |
| 4,927,950 | 5/1990 | Hisamoto et al. | 556/440 |
| 5,124,467 | 6/1992 | Rodgers et al. | 556/427 |
| 5,338,877 | 8/1994 | Sawada et al. | 556/440 |
| 5,514,731 | 5/1996 | Nakai | 525/106 |

FOREIGN PATENT DOCUMENTS

| | | |
|---|---|---|
| 0 166 363 A2 | 1/1986 | European Pat. Off. . |
| 0 738 771 A1 | 10/1996 | European Pat. Off. . |
| 0 749 021 A2 | 12/1996 | European Pat. Off. . |
| 58-46301 | 3/1983 | Japan . |
| 58-216195 | 12/1983 | Japan ................ 556/440 |
| 59-49501 | 3/1984 | Japan . |
| 59-50401 | 3/1984 | Japan . |
| 2-3472 | 1/1990 | Japan ................ 524/263 |
| 4-342592 | 11/1992 | Japan ................ 556/440 |
| 5-140509 | 6/1993 | Japan ................ 106/18.35 |
| 2 306 126 | 4/1997 | United Kingdom . |

OTHER PUBLICATIONS

McGaw–Hill Dictionary of Scientific and Technical Terms, Fourth Edition, p. 76, (1989).

Patent Abstracts of Japan, vol. 018, No. 176 (C–1183), Mar. 25, 1994, and JP 05 339007 A (Shin Etsu Chem Co. Ltd), Dec. 21, 1993.

*Primary Examiner*—Veronica P. Hoke
*Attorney, Agent, or Firm*—Hill & Simpson

[57] ABSTRACT

A composition for forming an antifouling film or an optical component having such an antifouling film, for example, an anti-reflection filter, contains an alkoxysilane compound having a perfluoropolyether group indicated by the following general formula (1):

$$R_f(COR_1-R_2-Si(OR_3)_3)_j \quad (1)$$

where, in the formula, $R_f$ indicates a perfluoropolyether group, $R_1$ indicates a bivalent atom or group, $R_2$ indicates an alkylene group, $R_3$ indicates an alkyl group, and j is 1 or 2.

10 Claims, 2 Drawing Sheets

COMPOSITION FOR FORMING ANTIFOULING ANTIFOULING FILM, OPTICAL COMPONENT, AND DISPLAY DEVICE

BACKGROUND OF THE INVENTION

1. Field of the Invention

The present invention relates to a composition for forming an antifouling film which can form an antifouling film excellent in stain resistance and abrasion resistance on a substrate, to an optical component which has the antifouling film and is adhered to a panel surface of a CRT (cathode ray tube) etc. and used as an anti-reflection filter, and to a display device to which the optical component is adhered on a panel surface thereof.

2. Description of the Related Art

When viewing an object through a transparent material, it is troublesome if the reflected light is strong and the reflected image is clear. In, for example, a lens for eyeglasses, a reflected image referred to as a "ghost" or "flare" is produced and gives an uncomfortable feeling to the eyes. Further, in a telescope or the like, there arises a problem in that the object viewed cannot discerned due to the light reflected on the glass surface.

Conventionally, the method used for preventing the reflection has been to form a coating of a substance having a different refractive index from that of the substrate on the substrate by a vacuum deposition process or the like. In this case, it has been known that the selection of the thickness of the substance covering the substrate is important so as to make the anti-reflection effect the highest.

For example, in a single coating film, it has been known that the selection of the thickness of an optical film of a substance having a lower refractive index than that of the substrate to ¼ of the light wavelength concerned or an odd multiple of the same gives the minimum reflection rate, that is, the maximum transmission rate.

Here, the optical film thickness is given by the product of the refractive index of the coating film forming material and the thickness of the coating film. Further, the formation of multiple anti-reflection layers is possible. Some proposals have been made concerning the selection of the film thickness in this case (Optical Technology Contact, Vol. 9, No. 8, p. 17, (1971)).

On the other hand, in Japanese Unexamined Patent Publication (Kokai) No. 58-46301, Japanese Unexamined Patent Publication (Kokai) No. 59-49501 and Japanese Unexamined Patent Publication (Kokai) No. 59-50401, a method of forming an anti-reflection film made of multiple layers satisfying the conditions of the optical film thickness by using a liquid composition has been disclosed.

In recent years, optical products having an anti-reflection property have been devised using a plastic film as a substrate actively utilizing the advantages thereof such as the light weight, safety, and ease of handling and have been commercialized by the method of adhering the same as an anti-reflection filter to the panel surface of a CRT etc. In many of them, use has been made of an inorganic oxide film represented by silicon dioxide or an inorganic halide film.

In the anti-reflection film formed by the vacuum deposition process or a sputtering process, the coating film forming material is mainly comprised of an inorganic oxide or inorganic halide, therefore the anti-reflection film essentially had a high surface hardness, but had drawbacks that stains due to finger marks, sweat, or cosmetic agents such as hair liquids and hair sprays were apt to be remarkable. It was also hard to remove these adhered stains. Further, since the slipperiness of the surface was poor, there was the problem that a scratch formed when it came into contact with a some hard object or another became wider etc. Further, since the wetting property with respect to water was large, there was the problem that when drops of rain and splashes of water were adhered, they largely expanded. In eyeglass lenses etc., the object viewed seemed to be distorted over a large area.

In the anti-reflection film disclosed in Japanese Unexamined Patent Publication (Kokai) No. 58-46301, Japanese Unexamined Patent Publication (Kokai) No. 59-49501, and Japanese Unexamined Patent Publication (Kokai) No. 59-50401 as well, in order to impart a high surface hardness, it is necessary to include at least 30 percent by weight of an inorganic substance such as fine silica particles in the outermost surface film, but the anti-reflection film obtained from such a film composition has problems that the surface slipperiness is poor and scratches are easily caused due to rubbing by cloth etc.

Various surface treatment agents have been proposed so as to solve these problems and are commercially available, but all of them are dissolved by water or various solvents, give their function only temporarily, are not permanent, and thus are poor in durability. Further, Japanese Unexamined Patent Publication (Kokai) No. 3-266801 reports the formation of a fluorine-based resin layer due to imparting of the volatility. However, although the volatility was indeed increased by these fluorine-based resins, satisfactory results with respect to the friction or abrasion could not be obtained.

SUMMARY OF THE INVENTION

The present invention was made in consideration with the above circumstances.

The first object is to provide a composition for forming an antifouling film which can form an antifouling film excellent in stain resistance, scratch resistance, solvent resistance, etc.

The second object is to provide an optical component having an antifouling film such as an anti-reflection filter.

The third object is to provide a display device having such an optical component.

The present inventors engaged in in-depth studies so as to solve the above problems and consequently reached the present invention mentioned as follows. Namely, the composition for forming an antifouling film of the present invention comprises:

(A) an alkoxysilane compound having a perfluoropolyether group expressed by the following general formula (1):

$$R_f\{COR_1-R_2-Si(OR_3)_3\}_j \qquad (1)$$

where, in the formula, $R_f$ indicates a perfluoropolyether group, $R_1$ indicates a bivalent atom or group, $R_2$ indicates an alkylene group, $R_3$ indicates an alkyl group, and $j$ is 1 or 2, and (B) one or more ingredients selected from among an acid or base, phosphate esters, and β-diketones.

The optical component of the present invention is characterized in that it has a plastic substrate; an outermost inorganic film provided on the plastic substrate via one or more other films or not via them; and an antifouling film using an alkoxysilane compound having a perfluoropolyether group covering the surface of the outermost inorganic film and expressed by the following general formula (1):

$$R_f(COR_1-R_2-Si(OR_3)_3)_j \qquad (1)$$

where, in the formula, $R_f$ indicates a perfluoropolyether group, $R_1$ indicates a bivalent atom or group, $R_2$ indicates an alkylene group, $R_3$ indicates an alkyl group, and j is 1 or 2 and using one or more ingredients selected from among an acid or base, phosphate esters, and β-diketones.

The display device of the present invention is characterized in that an optical component is adhered on a panel surface thereof, the optical component having a plastic substrate, an outermost inorganic film provided on the plastic substrate via one or more other films or not via them, and an antifouling film using an alkoxysilane compound having a perfluoropolyether group covering the surface of the outermost inorganic film and expressed by the following general formula (1):

$$R_f(COR_1-R_2-Si(OR_3)_3)_j \qquad (1)$$

where, in the formula, $R_f$ indicates a perfluoropolyether group, $R_1$ indicates a bivalent atom or group, $R_2$ indicates an alkylene group, $R_3$ indicates an alkyl group, and j is 1 or 2, and using one or more ingredients selected from among an acid or base, phosphate esters, and β-diketones.

The compound indicated by the above formula (1) has volatility by containing a fluorine compound in the molecule and is improved in its waterproof property and stain resistance. Further, since the fluorine compound is a perfluoropolyether group excellent in tribology, the abrasion resistance and friction resistance are better than those of the perfluoroalkyl group. In addition, since it contains in the molecule an alkoxysilanol group which interacts with the surface of the $SiO_2$, therefore, by for example heating, it forms a strong bond with the substrate, and therefore the problem of the solvent resistance etc. which have been conventionally unsatisfactory can be overcome.

Accordingly, the composition for forming the antifouling film containing the alkoxysilane compound having a perfluoropolyether group indicated by the above formula (1) can form an antifouling film having characteristics such as abrasion resistance, stain resistance, and solvent resistance on the surface of the substrate.

In this case, by incorporating one or more types selected from among an acid or base, phosphate esters, and β-diketones such as acetyl acetone in the composition for forming the antifouling film as a catalyst for accelerating the reaction with the substrate, a strong bond with the substrate can be formed even if the heating temperature is made low. For this reason, it becomes advantageous in terms of the production process and, at the same time, the range of selection of the substrate is broadened and thus the range of application of the composition for forming the antifouling film of the present invention can be expanded.

Note that, it has been generally known that an acid or base can be used as the catalyst at the time of preparing a solution of an alkoxysilane compound having a perfluoropolyether group, but it has not been known that, as shown in the present invention, there is a tribology effect such as a lubricant characteristic when forming an antifouling film, for example, a thin film of 10 nm. Further, the effect by an incorporation of a catalyst of the phosphoric esters family or a carbonyl compound such as acetyl acetone together with an acid or base has not been known either. In a thin film material such as an anti-reflection filter, there are tough demands on durability due to the film thickness. Incorporation of such a catalyst was experimented with so as to improve the durability thereof.

Further, since the optical component having a plastic substrate, an inorganic film, and an antifouling film formed on the surface of the inorganic film has an antifouling film having characteristics such as transparency, abrasion resistance, stain resistance, and solvent resistance formed on its surface, stains are difficult to adhere, stains are easily removed, and there is also durability with respect to abrasion.

BRIEF DESCRIPTION OF THE DRAWINGS

These and other objects and features of the present invention will become apparent from the following description of the present invention made with reference to the accompanying drawings, in which.

DESCRIPTION OF THE PREFERRED EMBODIMENTS

Figure 1:
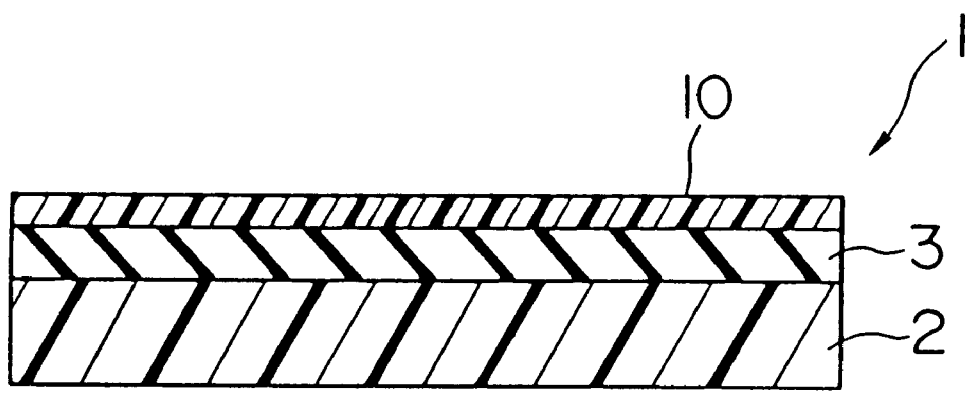
FIG. 1 is a sectional view of an example of an optical component of the present invention.

The composition for forming the antifouling film of the present invention contains an alkoxysilane compound having a perfluoropolyether group expressed by the following general formula (1) as mentioned above:

$$R_f(COR_1-R_2-Si(OR_3)_3)_j \qquad (1)$$

where, in the formula, $R_f$ indicates a perfluoropolyether group, $R_1$ indicates a bivalent atom or group, $R_2$ indicates an alkylene group, $R_3$ indicates an alkyl group, and j is 1 or 2.

The molecular weight of the alkoxysilane compound having such a perfluoropolyether group is not particularly critical, but the average number molecular weight is 500 to 10,000, preferably 500 to 2,000 in view of the safety and ease of handling.

$R_f$ in the above formula (1) is a monovalent or bivalent perfluoropolyether group. The concrete structure of such a perfluoropolyether group will be shown next, but the structure is not limited to this:

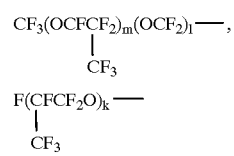

Here, l, m, n, k, p, and q in the above structural formula indicate integers of 1 or more.

The compound expressed by the above general formula (1) can form an antifouling film having the characteristics described above if it basically as a perfluoropolyether group and alkoxysilanol group, therefore there is essentially no limitation on the molecular structure other than the perfluoropolyether group. However, in actuality, there is a certain range from the viewpoint of ease of synthesis, that is, the realizability. Below, the structural parts will be explained from this viewpoint.

$R_1$ indicates a bivalent atom or group and is a group bonding with $R_2$ and the perfluoropolyether group. It is not particularly critical, but preferably is an atom or groups of atoms of O, NH, S, etc. other than carbon.

$R_2$ is a hydrocarbon group with a number of carbon atoms preferably within a range of from 2 to 10. As the $R_2$, an alkylene group such as a methylene group, ethylene group, and propylene group, a phenylene group, etc. can be exemplified.

$R_3$ is an alkyl group comprising the alkoxy group and usually has a number of carbon atoms of 3 or less, that is, an isopropyl group, propyl group, ethyl group, and methyl group can be exemplified, but the number of carbon atoms can be more than this.

In the composition for forming the antifouling film of the present invention, usually, the alkoxysilane compound having a perfluoropolyether group expressed by the above formula (1) is used by diluting this in a solvent. This solvent is not particularly critical, but at the time of use, it must be determined by considering the stability of the composition, the wetting property with respect to the silicon dioxide film, and the volatility. More specifically, there can be exemplified an alcohol-family solvent such as ethyl alcohol, a ketone-family solvent such as acetone, or a hydrocarbon-family solvent such as a hexane. These can be used as a solvent alone or in the form of a mixture of two or more types selected from among them.

In this case, as the catalyst, an acid such as hydrochloric acid or a base such as ammonia or a phosphorus ester such as a dilauryl phosphate ester is incorporated in the composition for forming the antifouling film. By incorporating such a catalyst, the reaction temperature with the substrate (drying temperature) can be made low. The amounts of incorporation of these catalysts are preferably about 0.001 to 1 mmol/L. Further, where the acid or base is incorporated, if β-diketones such as acetyl acetone are incorporated, the reaction thereof rises, so it is recommended that a carbonyl compound be incorporated in the composition for forming the antifouling film. The amount of incorporation of such a carbonyl compound can be determined to be about 0.1 to 100 mmol/L.

Then, by coating the composition for forming the antifouling film of the present invention on the surface of the substrate and for example heating, the solvent is volatized and, at the same time, a bond with the substrate is produced, so the antifouling film can be formed on the surface of the substrate.

As the coating method thereof, various methods used in a usual coating operation can be applied, but from the viewpoints of the uniformity of the anti-reflection effect and further the control of the reflection interference color, spin coating, dip coating, curtain flow coating, etc. are preferably used. Further, from the point of the workability, also a method of impregnating a liquid into a material such as a fabric and roll-coating the same can be preferably used.

Note that, at the coating of the alkoxysilane compound having the perfluoropolyether group according to the present invention, preferably the surface of the substrate which should be coated is cleaned, and, at the cleaning, stain removal by a surfactant and further degreasing by an organic solvent and cleaning by a fluorine-based gas etc. are applied. Further, application of various pretreatments for the purpose of the improvement of the adhesivity and durability is an effective means. As a particularly preferably used method, there can be mentioned an activation gas treatment, chemical treatment by an acid or alkali, etc.

Further, after coating the paint composition on the surface of the substrate, so as to volatize the solvent and, at the same time, cause the alkoxysilane in the compound indicated by the above formula (1) to react with the substrate and impart a strong bond, the coating film is preferably heat-treated.

The heating temperature in this case is selected by considering the heat resistance of the substrate etc. The heating temperature is appropriately within a range of from 30 to 80° C. where polyethylene terephthalate is used as the substrate.

Further, also the thickness of the antifouling film formed by the alkoxysilane compound having such a perfluoropolyether group is not particularly limited, but is desirably 0.5 nm to 50 nm, further preferably 1 nm to 20 nm, from the balance with the static contact angle with respect to water and the relationship with the surface hardness.

The substrate on which is formed the antifouling film is not particularly limited, but preferably at least the surface is constituted by an inorganic material. For example, it can be preferably used for an anti-reflection filter having an inorganic film as for example an anti-reflection film formed on a glass panel of a CRT or the surface of a plastic substrate. The inorganic film used for the anti-reflection filter is selected by considering the transparency, refractive index, heat resistance, anti-reflection property, reflected light color, durability, surface hardness, etc. and is not particularly limited, but desirably is mainly comprised by $SiO_2$. This is because, if the inorganic film is mainly comprised by $SiO_2$, a more sufficient surface hardness is obtained and, at the same time, the improvement of the stain resistance and scratch resistance which is the object of the present invention and further the durability of these performances conspicuously appear. However, the present invention is not particularly limited to silicon dioxide ($SiO_2$).

The antifouling film formed by the composition for forming the antifouling film of the present invention has characteristics such as abrasion resistance, stain resistance, and solvent resistance and therefore can give a surface which has advantages with respect to the substrate, for example, it is hard to stain, the stains do not stand out, and further the stains are easily removed, and it is hard to form a scratch due to the good surface slipperiness and, in addition, there is durability also with respect to abrasion and, at the same time, a good durability also with respect to a solvent.

BRIEF DESCRIPTION OF THE DRAWINGS

Figure 2:
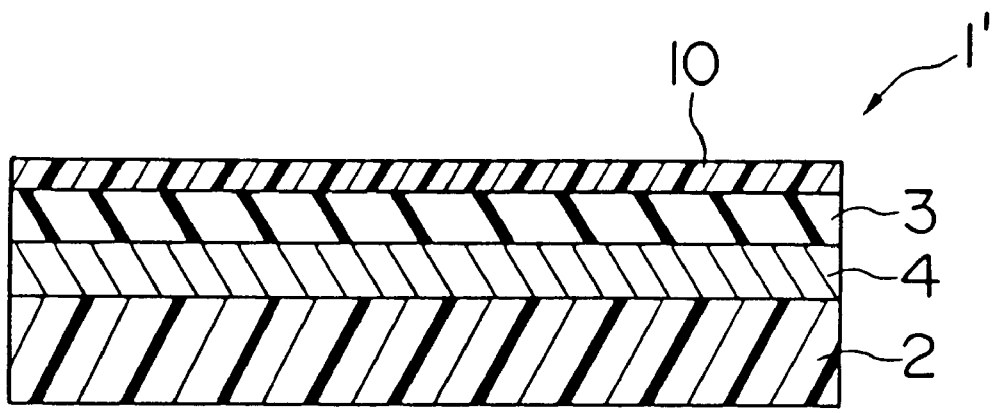
FIG. 2 is a sectional view of another example of the optical component of the present invention.
Figure 3:
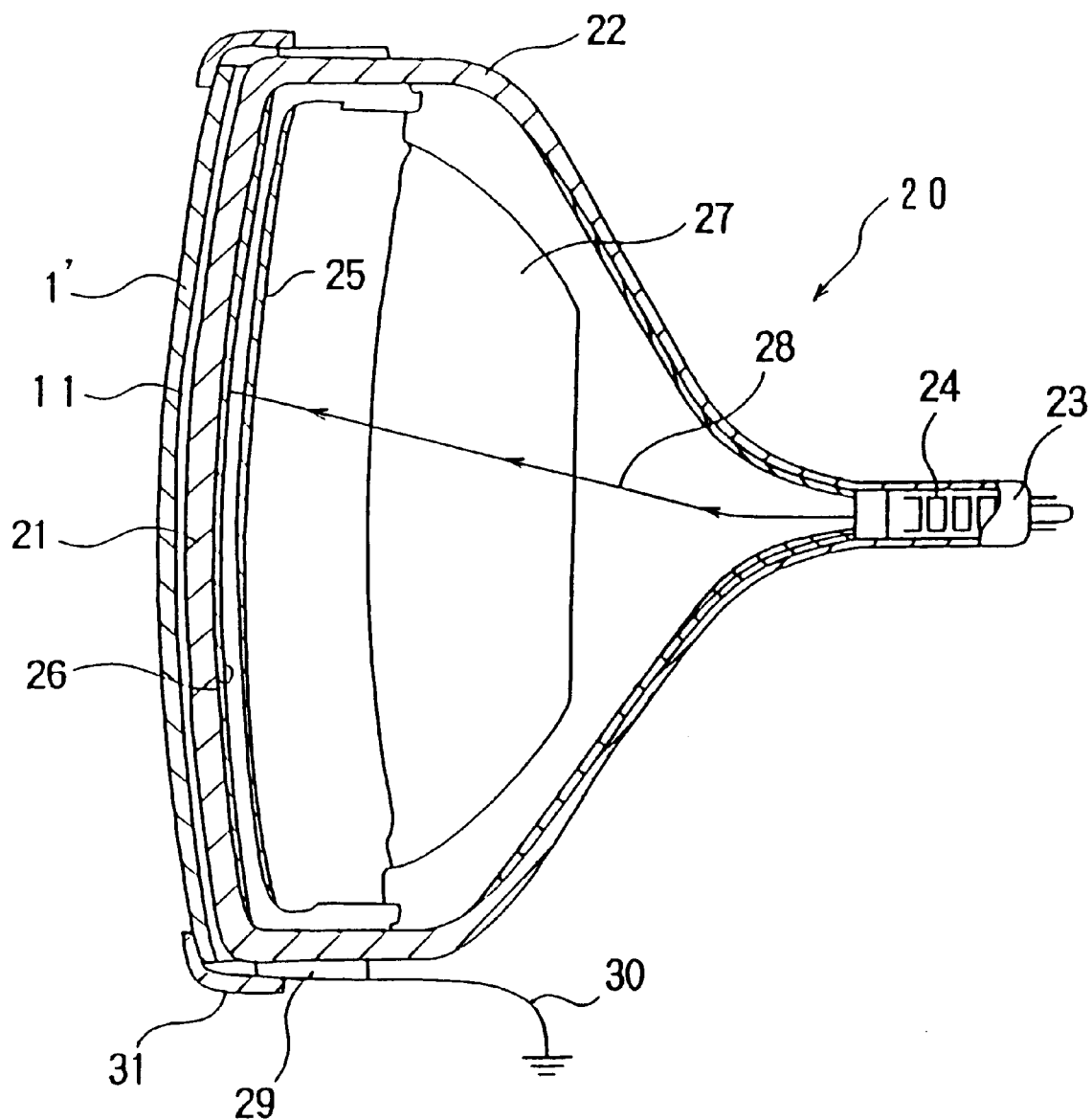
FIG. 3 is a sectional view of the display device of the present invention having the optical component of the present invention on a panel surface thereof.

Next, an explanation will be made of the optical component of the present invention. An example of the sectional structure of the optical component of the present invention is shown in FIG. 1. This optical component 1 is constituted by a plastic substrate 2, an inorganic film 3 serving as the anti-reflection film covering one surface thereof, and an antifouling film 10 coating that inorganic film 3. Further, it is also possible to interpose one or more layers (only one layer is shown in the figure) of a functional film 4 between the plastic substrate 2 and the inorganic film 3 like the optical component 1' shown in FIG. 2. A sectional view of a display device having a film shape optical component 1 adhered on the panel surface of a CRT is shown in FIG. 3.

The antifouling film 10 is formed by the composition for forming the antifouling film of the present invention and uses the alkoxysilane compound having the perfluoropolyether group indicated by the following general formula (1) as mentioned above:

$$R_f(COR_1\text{—}R_2\text{—}Si(OR_3)_3)_j \qquad (1)$$

where, in the formula, $R_f$ indicates a perfluoropolyether group, $R_1$ indicates a bivalent atom or group, $R_2$ indicates an alkylene group, $R_3$ indicates an alkyl group, and j is 1 or 2.

In the present invention, as the plastic substrate 2, use can be made of any substrate so far as it is comprised by an organic polymer, but is selected in views of the optical characteristics such as transparency, refractive index, and dispersion and further various physical properties such as shock resistance, heat resistance, and durability. Concretely, preferably use can be made of polymethylmethacrylate and a copolymer thereof, polycarbonate, diethyleneglycol-bis-aryl carbonate (CR-39), a polymer of a urethane-modified monomer of a mono(meth)acrylate of bisphenol A (brominated) and a copolymer thereof, a polyester, particularly polyethylene terephthalate, polyethylene naphthalate, and an unsaturated polyester, acrylonitrile-styrene copolymer, vinyl chloride, polyurethane, an epoxy resin, etc. Further, also the use of an aramide-family resin taking the heat resistance into account is possible. In this case, the upper limit of the heating temperature becomes 200° C. or more, and thus it can be expected that the temperature range thereof becomes wide.

The shape of the plastic substrate 2 may be a sheet, film, or other predetermined shape. The film thickness where the plastic substrate 2 is shaped to a sheet or film is appropriately for example 50 to 300 $\mu$m, more preferably about 100 to 200 $\mu$m.

In the present invention, the inorganic film 3 mainly acts as an anti-reflection film. For this reason, in the specification, it is sometimes referred to as an anti-reflection film. As the inorganic film 3, other than this, also a conductive film such as ITO can be adopted. The inorganic film 3 used as the outermost surface film is selected by considering the transparency, refractive index, heat resistance, anti-reflection property, reflected light color, durability, surface hardness, etc. and is not particularly critical, but is desirably mainly comprised by $SiO_2$. This is because, if the inorganic film is mainly comprised by $SiO_2$, a more sufficient surface hardness is obtained and, at the same time, the improvement of the stain resistance and scratch resistance which is the object of the present invention and further the durability of these performances conspicuously appear. However, the optical component of the present invention is not particularly limited to silicon dioxide ($SiO_2$) since the characteristic feature resides in the material coating the anti-reflection film.

As the coating method of various inorganic substances containing $SiO_2$ comprising these inorganic films, there are vacuum deposition and various PVD (physical vapor deposition) processes represented by ion implantation and sputtering. As the inorganic substances adapted to these PVC processes, other than $SiO_2$, inorganic oxides such as $Al_2O_3$, $ZrO_2$, $TiO_2$, $Ta_2O_3$, SiO, $HfO_2$, ZnO, $In_2O_3/SnO_2$, TiO, $Ti_2O_3$, $Y_2O_3$, $Sb_2O_3$, MgO, and $CeO_2$ are preferably applied.

Further, the film thicknesses of the inorganic films 3 should be respectively determined according to the required performances other than the anti-reflection effect, but particularly in order to exhibit the anti-reflection effect to the highest limit, it is preferred from such a viewpoint that the minimum reflection rate, that is, the maximum transmission rate be given to select the optical film thickness of the outermost surface film to ¼ of the light wavelength concerned or an odd multiple of the same.

The functional film 4 interposed between the plastic substrate 2 and the inorganic film 3 can improve the physical properties for example the adhesivity, hardness, chemical resistance, durability, and dyeing property. As the inorganic film 3, one or more types of the anti-reflection film, conductive film, hard coat, etc. can be combined.

As the hard coat, for the improvement of the hardness, use can be made of one to which various materials which have been known as surface-hardened coating films of plastics heretofore are applied (Japanese Examined Patent Publication (Kokoku) No. 50-28092, Japanese Examined Patent Publication (Kokoku) No. 50-28446, Japanese Examined Patent Publication (Kokoku) No. 50-39449, Japanese Examined Patent Publication (Kokoku) No. 51-24368, Japanese Unexamined Patent Publication (Kokai) No. 52-112698, Japanese Examined Patent Publication (Kokoku) No. 57-2735, etc.) Further, it can be an acrylic cross-linking agent obtained from (meth)acrylic acid, pentaerythritol, or the like too.

The film structure of the substance forming the functional film 3 can be optionally experimentally determined according to required performances, for example, the heat resistance, anti-reflection property, reflected light color, durability, and surface hardness. Note that, where the functional film 4 is comprised by the anti-reflection film, two or more layers of anti-reflection film together with the inorganic film 3 will be constituted. In order to make the anti-reflection effect more conspicuous, as the functional film 4, effectively one or more layers of anti-reflection films having a higher refractive index than that of the inorganic film 3 are formed. Some proposals have been made also concerning the selection of the film thickness and refractive index of these multiple layer anti-reflection films (Optical Technology Contact Vol. 9, No. 8, pp 17, (1971)).

Further, the antifouling film 10 is formed by using the composition for forming the antifouling film of the present invention. The composition thereof and the method of forming the antifouling film have been already explained in detail, so an explanation is omitted here. Such an antifouling film has transparency and, at the same time, has characteristics such as abrasion resistance, stain resistance, and solvent resistance. Also the film thickness of the antifouling film is not particularly limited, but is desirably 0.5 nm to 50 nm, further preferably 1 nm to 20 nm, in view of the anti-reflection property, a balance with the static contact angle with respect to water, and the surface hardness.

The optical component of the present invention is preferred as the anti-reflection filter of a display device of a CRT etc. It is possible to directly adhere the same to the panel surface of the CRT etc. or adhere the same to the front surface plate of the CRT. As the method of adhesion, preferably, for example a method of using a binder is preferred. Such a binder is not particularly limited, and various well known binders can be used, but generally an ultraviolet ray curable resin-family binder is used and the refractive index of the cured layer thereof preferably approximates the refractive index of the panel, for example, the difference of them becomes within 0.8 percent or less. Concretely, use can be made of for example a composition having a molecular weight of 550 containing 10 percent by weight of bisphenol A type epoxy (meth)acrylate, 20 percent by weight of urethane (meth)acrylate, 70 percent by weight of a hydroxyl group-containing mono)meth)acrylate, 3 percent of a photopolymerization initiator, and about several percentages of other additives.

A sectional view of a display device having a film shape optical component 1' adhered on the panel surface of a CRT is shown in FIG. 3. This structure shows an example where the functional layer 4 of the optical component is composed of a conductive layer and this conductive layer can cancel out a leakage electromagnetic field.

This color CRT has a vacuum envelope composed of a faceplate 21, a funnel 22, and a neck tube 23. The faceplate 21 and funnel 22 are joined with frit glass. A tension band 29 is wound around the outer surface of faceplate 21. The tension band 29 is made of a conductive material such as a metal and is connected to the ground via an earth line 30.

A fluorescent screen 26 composed of blue, green, and red phosphors is applied on an inner surface of the panel 21. A color selecting mask 25 is disposed near the fluorescent screen 26. The color selecting mask 25 is held by a mask holding frame. A magnetic shield 27 is attached on the electron gun 24 side thereof.

An electron beam emitted from the electron gun 24 held in the neck 23 reaches the fluorescent screen 26 formed on the inner surface of the faceplate through the color selecting mask 25, excites the prescribed phosphors, and makes them emit light.

The optical component 1 is adhered by a binder on the faceplate 21. The conductive layer of the optical component 1 is connected to a conductive tape 31 in a manner not shown this figure. This conductive tape 31 is connected to the tension band 29. Therefore, the conductive layer of the optical component 1 is connected to the ground via the conductive tape 31 and tension band 29.

This CRT 20 can be prevented from reflection of external light or other light which would prevent viewing of the picture by the optical component 1' so can give a high quality picture. In addition, this CRT 20 can cancel out the leakage electromagnetic field, so can prevent any effect of electromagnetic fields on the viewers.

The method of adhering the optical component 1 is preferably a binder. The binder is not limited. Any kind of binder may be used. In general, preferably, an ultraviolet ray curable resin family binder as mentioned above can be used.

Below, the present invention will be further concretely explained by examples, but the present invention is not limited to these examples. Note that, in the examples, "parts" represent parts by weight.

EXAMPLE 1

(1) Preparation of anti-reflection film

As the substrate, a transparent polyethylene terephthalate (PET) film having a thickness of 100 $\mu$m was used. On one surface of this PET film, as an anti-reflection film, an ITO having a thickness of 120 nm was pre-deposited by a vacuum deposition process and $SiO_2$ was deposited on this to 70 nm.

(2) Preparation of composition for forming the antifouling film

Four parts of an alkoxysilane compound having a perfluoropolyether group shown in Table 1 (compound 1 in Table 1 having a molecular weight of about 1000) was dissolved in 200 parts of alcohol. Further, one part of acetyl acetone and 0.01 part of concentrated hydrochloric acid were added to obtain a homogeneous solution, and then filtering was further carried out by a membrane filter, thereby to obtain the composition for forming the antifouling film.

(3) Formation of antifouling film

The composition for forming the antifouling film obtained in the above (2) was dip-coated on the surface of the anti-reflection film obtained in the above (1) at a pull-up speed of 5 cm/min. After coating, it was dried at a temperature of 70° C. for 1 hour to obtain an optical component having an anti-reflection property on which the antifouling film was formed.

(4) Evaluation of performance

The performances of the obtained optical component were evaluated by performing the tests according to the following methods (a) to (e). The results are shown in Table 2. Further, the results of evaluation of the following methods of (a) to (e) after cleaning by alcohol will be similarly described as "Before" and "After" in Table 2 as the tests of the solvent resistance.

(a) Stain resistance test

A residual state of spots when 5 ml of tap water was dropped onto the filter surface, the surface was allowed to stand under a room temperature a 25° C. for 48 hours, and then the surface was wiped by a cloth was observed. A case when the spots could be removed was evaluated as good and a case where they could not be removed was evaluated as bad.

(b) Surface slipperiness (b) Surface slipperiness test

The formation of scratches when scratching the surface of filter by the tip of a pencil (UNI brand made by Mitsubishi Pencil having hardness of at least 3H) under conditions of 1 kgf force, 45° angle, 10 mm stroke, and 5 attempts was evaluated. The judgments were made according to the following criteria:

○: Pencils didn't scratch at all, namely didn't cause stickslip

Δ: Pencils scratched one or two times

×: Pencils scratched more than three times (c) Abrasion resistance test

It was confirmed whether a scratch was formed after rubbing the surface of the antifouling film 30 times under a weight of 200 g by using steel wool #0000.

○: No scratches at all

Δ: Fine scratches formed

×: Remarkable scratching (d) Resistance to hand marks

The resistance to deposition of hand marks when touching the surface of the antifouling film by hand was evaluated by the naked eye. In this case, as artificial sweat, a solution which included 5 g of sodium chloride, 5 ml of acetic acid, 3 ml of butyric acid, and 84 of distilled water was used.

The judgement was made according to the following criteria:

○: Did not stand out even if present

Δ: Present, but could be easily removed

×: Marks stood out (e) Contact angle

The contact angle of water and methylene iodide was measured. This contact angle serves as a measure of the rate of the remaining antifouling film and the contaminability with respect to water or oil. Further, the values before and after cleaning the surface by ethanol were measured in order to examine the safety with respect to a solvent.

EXAMPLE 2 TO EXAMPLE 10

The tests were carried out in exactly the same way as those for Example 1 except that compounds 2 to 10 shown in Table 1 were respectively used in place of the compound 1 in the composition for forming the antifouling film of Example 1. The results are described in Table 2.

EXAMPLE 11 TO EXAMPLE 15

The test was carried out in the same way as that for Example 1 except the compound 6 shown in Table 1 was used in place of the compound 1 in the composition for forming the antifouling film of Example 1 and the reaction temperatures (heating temperatures) at the formation of the antifouling film were determined to be the temperatures shown in Table 3. The results are described in Table 3. The stain resistance and surface slipperiness at this time were similar, and therefore the description will be omitted. It is confirmed that the characteristics of the antifouling film are improved as the heating temperature is higher. However, when the heating temperature exceeds 100° C., the polyethylene terephthalate of the substrate is deformed, therefore this is not preferred.

COMPARATIVE EXAMPLE 1 TO COMPARATIVE EXAMPLE 5

Comparative Example 1 shows a case where absolutely no antifouling film is coated. In Comparative Examples 2 to 5, the tests were carried out in exactly the same way except the compounds shown in Table 4 were respectively used in place of the compound 1 in the composition for forming the antifouling film of Example 1. The results are described in Table 4. They are clearly inferior in characteristics of abrasion resistance and surface slipperiness.

COMPARATIVE EXAMPLE 6 TO COMPARATIVE EXAMPLE 9

The tests were carried out in exactly the same way except the compounds shown in Table 5 were respectively used in place of the compound 1 in the composition for forming the antifouling film of Example 1. The results are described in Table 5. Further, the values before and after cleaning the surface by ethanol were measured in order to examine the safety with respect to a solvent. The results are shown in Table 6.

When a perfluoropolyether ammonium salt is used (Comparative Examples 6 to 8), there is no problem in the abrasion resistance and slipperiness, but the characteristics are considerably deteriorated after cleaning by alcohol. When a perfluoroalkoxysilane is used (Comparative Example 9), the characteristics such as the abrasion resistance and surface slipperiness are clearly inferior.

TABLE 1

| | $R_f$ | $R_1$ | $R_2$ | $R$ |
|---|---|---|---|---|
| Compound 1 | $F(CF_2CF_2CF_2O)_1CF_2CF_2CH_2$ | O | $C_3H_6$ | $CH_3$ |
| Compound 2 | $F(CF_2CF_2CF_2O)_1CF_2CF_2CH_2$ | O | $C_3H_6$ | $CH_3$ |
| Compound 3 | $CF_3(OCFCF_2)_1OCF_2$ with $CF_3$ branch | O | Ph* | $CH_3$ |
| Compound 4 | $CF_3(OCFCF_2)_1OCF_2$ with $CF_3$ branch | O | Bz* | $CH_3$ |
| Compound 5 | $F(CF_2CF_2CF_2O)_1CF_2CF_2CH_2$ | NH | $C_3H_6$ | $CH_3$ |
| Compound 6 | $CF_3(OCFCF_2)_1OCF_2"$ with $CF_3$ branch | NH | $C_3H_6$ | $C_2H_5$ |
| Compound 7 | $F(CF_2CF_2CF_2O)_1CF_2CF_2CH_2$ | NH | Ph | $C_2H_5$ |
| Compound 8 | $CF_3(OCFCF_2)_1OCF_2"$ with $CF_3$ branch | NH | $C_{10}H_{20}$ | $C_2H_5$ |
| Compound 9 | $CF_3(OCFCF_2)_1OCF_2"$ with $CF_3$ branch | NH | Bz* | $C_2H_5$ |
| Compound 10 | $F(CF_2CF_2CF_2O)_1CF_2CF_2CH_2$ | S | $C_3H_6$ | $C_2H_5$ |

*Ph indicates $C_6H_4$, and Bz indicates $CH_2C_6H_4CH_2$

TABLE 2

| | | Stain resistance | | Surface slipperiness | | Abrasion resistance test | | Resistance to hand marks | | Contact angle (deg) | | | |
|---|---|---|---|---|---|---|---|---|---|---|---|---|---|
| | | | | | | | | | | $H_2$ Before ethanol cleaning | $CH_2I_2$ | $H_2O$ After ethanol cleaning | $CH_2I_2$ |
| Ex. | Compound | Before | After | Before | After | Before | After | Before | After | | | | |
| Ex. 1 | Compound 1 | Good | Good | o | o | o | o | o | o | 115 | 91 | 114 | 90 |
| Ex. 2 | Compound 2 | Good | Good | o | o | o | o | o | o | 113 | 93 | 112 | 93 |
| Ex. 3 | Compound 3 | Good | Good | o | o | o | o | o | o | 116 | 94 | 115 | 94 |
| Ex. 4 | Compound 4 | Good | Good | o | o | o | o | o | o | 112 | 92 | 113 | 91 |
| Ex. 5 | Compound 5 | Good | Good | o | o | o | o | o | o | 115 | 91 | 115 | 92 |
| Ex. 6 | Compound 6 | Good | Good | o | o | o | o | o | o | 114 | 94 | 113 | 94 |
| Ex. 7 | Compound 7 | Good | Good | o | o | o | o | o | o | 117 | 92 | 115 | 91 |
| Ex. 8 | Compound 8 | Good | Good | o | o | o | o | o | o | 115 | 95 | 116 | 94 |
| Ex. 9 | Compound 9 | Good | Good | o | o | o | o | o | o | 113 | 92 | 115 | 91 |
| Ex. 10 | Compound 10 | Good | Good | o | o | o | o | o | o | 115 | 94 | 114 | 93 |

TABLE 3

| Ex. | Compound | Reaction temp. (°C.) | Resistance to hand marks Before | | Abrasion resistance test After | | Contact angle (deg) | | | |
|---|---|---|---|---|---|---|---|---|---|---|
| | | | | | | | H$_2$O Before ethanol cleaning | CH$_2$I$_2$ Before ethanol cleaning | H$_2$O After ethanol cleaning | CH$_2$I$_2$ After ethanol cleaning |
| Ex. 11 | Compound 6 | 30 | o | o | o | o | 112 | 89 | 105 | 81 |
| Ex. 12 | Compound 6 | 50 | o | o | o | o | 113 | 91 | 112 | 93 |
| Ex. 13 | Compound 6 | 70 | o | o | o | o | 114 | 94 | 113 | 94 |
| Ex. 14 | Compound 6 | 100 | o | o | o | o | 115 | 93 | 113 | 92 |
| Ex. 15* | Compound 6 | 150 | o | o | o | o | 115 | 91 | 115 | 92 |

*Deformation is seen in substrate

TABLE 4

| | | Contamination resistance | Surface slipperiness | Abrasion resistance test | Resistance to hand marks |
|---|---|---|---|---|---|
| Comp. Ex. 1 | No coating agent | Poor | x | x | x |
| Comp. Ex. 2 | Polytetrafluoroethylene | Good | Δ | x | o |
| Comp. Ex. 3 | Polyvinylidene fluoride | Good | Δ | x | o |
| Comp. Ex. 4 | Tetrafluoroethylene-ethylene copolymer | Good | Δ | x | o |
| Comp. Ex. 5 | Chlorotrifluoroethylene-ethylene copolymer | Good | Δ | x | Δ |

TABLE 5

| | Molecular structure | Contamination resistance | Surface slipperiness | Abrasion resistance test | Resistance to hand marks |
|---|---|---|---|---|---|
| Comp. Ex. 6 | RNH$_3$OOCCF$_2$(CF$_2$O)$_n$(C$_2$F$_4$O)$_m$CF$_2$COON$^-$H$_3$R$^+$ | Good | o | o | o |
| Comp. Ex. 7 | F(CF$_2$CF$_2$CF$_2$O)$_1$CF$_2$CF$_2$COONH$_3$R | Good | o | o | o |
| Comp. Ex. 8 | CF$_3$F(CFCF$_2$O)$_1$CF$_2$FCOONH$_3$R | Good | o | o | o |
| Comp. Ex. 9 | C$_8$F$_{17}$C$_2$H$_4$Si(OC$_2$H$_5$)$_3$ | Good | Δ | Δ | o |

*R = C$_{18}$H$_{37}$

TABLE 6

| | Contamination resistance | Surface slipperiness | Abrasion resistance test | Resistance to hand marks |
|---|---|---|---|---|
| Comp. Ex. 6 | Poor | Δ | o | x |
| Comp. Ex. 7 | Poor | Δ | Δ | x |
| Comp. Ex. 8 | Poor | Δ | o | x |

EXAMPLE 16

(1) Preparation of anti-reflection film

As the substrate, a transparent polyethylene terephthalate (PET) film having a thickness of 100 μm was used. On one surface of this PET film, a hard coat treatment for securing surface hardness is applied in advance, ITO having a thickness of 120 nm was pre-deposited on this as the anti-reflection film by a vacuum deposition process, and SiO$_2$ was deposited on this to 70 nm. The hard coat treatment referred to here is generally carried out by coating an acrylic cross-linking resinous material, cross-linking and curing the same by ultraviolet ray or electron beam, coating a silicon-family, melamine-family, and epoxy-family resinous material, and heat curing the same.

(2) Preparation of composition for forming the antifouling film

Four parts of alkoxysilane compound having a perfluoropolyether group shown in Table 7 (compound 1 in Table 7 having a molecular weight of about 1000) was dissolved in 200 parts of alcohol. Further, 1 cc of acetyl acetone and 0.01 cc of concentrated hydrochloric acid were added to obtain a homogeneous solution, and then filtering was further carried out by a membrane filter, thereby to obtain the composition for forming the antifouling film.

(3) Formation of antifouling film

The composition for forming the antifouling film obtained in the above (2) was dip-coated on the surface of the anti-reflection film obtained in the above (1) at a pull-up speed of 5 cm/min. After coating, it was dried at a temperature of 70° C. for 1 hour to obtain an optical component having an anti-reflection property on which the antifouling film was formed.

(4) Evaluation of performance

For the performances of the obtained optical articles, the above tests of (a) stain resistance test, (b) surface slipperiness, (c) abrasion resistance test, (d) resistance to hand marks, and (e) contact angle were carried out for the evaluation. The results are shown in Table 8. Further, the results of evaluation of the above methods of (a) to (e) after performing cleaning by alcohol will be similarly described as "Before" and "After" in Table 8 as the test of the solvent resistance.

EXAMPLE 17

The test was carried out in the same way as that for Example 16 except the acetyl acetone was not incorporated (catalyst was only hydrochloric acid) at the time of preparation of the composition for forming the antifouling film in Example 16. The results are described in Table 8.

EXAMPLE 18

The test was carried out in the same way as that for Example 16 except ammonia water was used (incorporation amount: 0.01 part) in place of the hydrochloric acid (catalysts were the ammonia water and acetyl acetone) at the time of preparation of the composition for forming the antifouling film in Example 16. The results are described in Table 8.

EXAMPLE 19

The test was carried out in the same way as that for Example 16 except dilauryl phosphate ester was used (incorporation amount: 0.5 part) in place of the hydrochloric acid (catalyst was dilauryl phosphate ester) at the time of preparation of the composition for forming the antifouling film in Example 16. The results are described in Table 8.

EXAMPLE 20

The test was carried out in the same way as that for Example 16 except the compound 2 shown in Table 2 (perfluoropolyether having a molecular weight of about 1000 and having alkoxysilano groups at both terminal ends) was used in place of the compound 1 of the composition for forming the antifouling film in Example 16. The results are described in Table 8.

EXAMPLE 21

The test was carried out in the same way as that for Example 16 except the hydrochloric acid and acetyl acetone were not incorporated (no catalyst) at the time of preparation of the composition for forming the antifouling film in Example 16. The results are described in Table 8.

EXAMPLE 22

The test was carried out in the same way as that for Example 16 except the compound 2 shown in Table 2 (perfluoropolyether having a molecular weight of about 1000 and having alkoxysilanol groups at both terminal ends) was used in place of the compound 1 of the composition for forming the antifouling film in Example 16, and then the hydrochloric acid and acetyl acetone were not used (no catalyst). The results are described in Table 8.

COMPARATIVE EXAMPLE 10

This is a case where no antifouling film is formed. It is clearly confirmed that the characteristics of abrasion resistance and surface slippage are inferior.

EXAMPLE 23 TO EXAMPLE 27

The tests were carried out in the same way as that for Example 16 except the drying temperatures (reaction temperatures) at the formation of the antifouling film in Example 16 (as the catalysts, the hydrochloric acid and acetyl acetone were used together) were determined to be the temperatures shown in Table 9. Similar results are obtained for the stain resistance and surface slippage at this time, and therefore the description will be omitted. The results are described in Table 9. When the heating temperature exceeds 100° C., the characteristics are satisfactory, but the polyethylene terephthalate of the substrate is deformed, and therefore it is not preferred. When it is dried at a high temperature, preferably a substrate having a high glass transition point such as polyimide or polyamide is used.

EXAMPLE 28 TO EXAMPLE 32

The tests were carried out in the same way as that for Example 16 except the hydrochloric acid and acetyl acetone were not incorporated at the time of preparation of the composition for forming the antifouling film in Example 16, and the antifouling film was formed by the composition for forming the antifouling film with n ncatalyst at the drying temperatures (reaction temperatures) shown in Table 10. The results are described in Table 10.

It is confirmed from Table 9 and Table 10 that a good antifouling film can be formed even at the drying temperature of 30° C. and the effects of the catalyst are conspicuous in the compositions for forming the antifouling film incorporated with a catalyst.

[TABLE 7]

| | Structural formula |
|---|---|
| Compound 1 | $CF_3$<br>$CF_3O(CFCF_2O)_lCF_2CONHC_3H_6Si(OC_2H_5)_3$ |
| Compound 2 | $(C_2H_5O)_3SiC_3H_6NHCOCF_2O(CF_2O)_n(CF_2CF_2O)_mCF_2CONHC_3H_6Si(OC_2H_5)_3$ |

[TABLE 8]

| | | Stain resistance | | Surface slipperiness | | Abrasion resistance test | | Resistance to hand marks | | Contact angle (deg) | | | |
|---|---|---|---|---|---|---|---|---|---|---|---|---|---|
| | | | | | | | | | | $H_2)$ Before ethanol cleaning | $CH_2I_2$ | $H_2O$ After ethanol cleaning | $CH_2I_2$ |
| Ex. | Compound | Before | After | Before | After | Before | After | Before | After | | | | |
| Ex. 16 | Compound 1 | Good | Good | o | o | o | o | o | o | 115 | 91 | 114 | 90 |
| Ex. 17 | Compound 1 | Good | Good | o | o | o | o | o | o | 113 | 93 | 112 | 93 |
| Ex. 18 | Compound 1 | Good | Good | o | o | o | o | o | o | 116 | 94 | 115 | 94 |
| Ex. 19 | Compound 1 | Good | Good | o | o | o | o | o | o | 112 | 92 | 113 | 91 |
| Ex. 20 | Compound 2 | Good | Good | o | o | o | o | o | o | 115 | 91 | 115 | 92 |
| Ex. 21 | Compound 1 | Good | Good | o | o | o | o | o | o | 115 | 91 | 115 | 92 |
| Ex. 22 | Compound 2 | Good | Good | o | o | o | o | o | o | 115 | 91 | 115 | 92 |
| Comp. Ex. 10 | None | Poor | Poor | x | x | x | x | x | x | 35 | 91 | — | — |

Remarks
Example 16 uses hydrochloric acid and acetyl acetone as the catalysts
Example 17 uses hydrochloric acid
Example 18 uses ammonia water and acetyl acetone
Example 19 uses dilauryl phosphate ester
Example 20 uses hydrochloric acid and acetyl acetone

[TABLE 9]

| | Reaction temp. (° C.) | Resistance to hand marks Before | Abrasion resistance test After | $H_2O$ Before ethanol cleaning | $CH_2I_2$ | $H_2O$ After ethanol cleaning | $CH_2I_2$ |
|---|---|---|---|---|---|---|---|
| Ex. 23 | 30 | o | o | 112 | 89 | 111 | 91 |
| Ex. 24 | 50 | o | o | 113 | 91 | 112 | 93 |
| Ex. 25 | 70 | o | o | 114 | 94 | 113 | 94 |
| Ex. 26 | 100 | o | o | 115 | 93 | 113 | 92 |
| Ex. 27* | 150 | o | o | 115 | 91 | 115 | 92 |

*Deformation is seen in substrate
***"Before" indicates "before cleaning by ethanol, and "after" indicates "after cleaning by ethanol.

[TABLE 10]

| | Reaction temp. (° C.) | Resistance to hand marks Before | | Abrasion resistance test After | | $H_2O$ Before ethanol cleaning | $CH_2I_2$ | $H_2O$ After ethanol cleaning | $CH_2I_2$ |
|---|---|---|---|---|---|---|---|---|---|
| Ex. 28 | 30 | o | Δ | o | Δ | 112 | 89 | 101 | 78 |
| Ex. 29 | 50 | o | Δ | o | Δ | 113 | 91 | 106 | 81 |
| Ex. 30 | 70 | o | Δ | o | Δ | 114 | 94 | 108 | 84 |
| Ex. 31 | 100 | o | Δ | o | Δ | 115 | 93 | 109 | 82 |
| Ex. 32* | 150 | o | o | o | o | 115 | 91 | 108 | 84 |

*Deformation is seen in substrate

The composition for forming the antifouling film of the present invention can form an antifouling film having the following characteristics on the surface of a substrate:

(1) Stains due to finger marks and hand marks, etc. are difficult to adhere and difficult to stand out and these effects are permanently held.

(2) Even if spots or the like are deposited and dried, they can be easily removed.

(3) Surface slipperiness is good.

(4) Stains such as dust are difficult to adhere and the usability is good.

(5) There is a durability against abrasion.

Further, in the optical component of the present invention, since the antifouling film having the above characteristics is formed, it is excellent in the slipperiness, stain resistance, abrasion resistance, etc. and is preferable as an anti-reflection filter for a CRT etc.

While this invention has been described with reference to illustrative embodiments, this description is not intended to be construed in a limiting sense. Various modifications of the illustrative embodiments are covered within the true scope of the invention.

What is claimed is:

1. A composition for forming an antifouling layer comprising:

(A) from about 0.1 to about 5.0% by weight of an alkoxysilane compound having a perfluoropolyether group selected from compounds having the formula:

$$R^f(COR^1-R^2-Si(OR^3)_3)_j,$$

wherein $R^f$ is selected from $$F(CF_2CF_2CF_2O)_n-,$$

$$CF_3(OCFCF_2)_m(OCF_2)_l-,$$
$$\ \ \ \ \ \ \ \ \ \ \ |$$
$$\ \ \ \ \ \ \ \ \ \ CF_3$$

$$F(CFCF_2O)_k-, \text{ or}$$
$$\ \ \ \ |$$
$$\ \ CF_3$$

$$-(OC_2F_4)_p(OCF_2)_q-,$$

wherein k, l, m, n, p and q are integers of 1 or more; $R^1$ is selected from O, N or S; $R^2$ is selected from divalent alkylene, benzylene or phenylene; and $R^3$ is an alkyl group and j is 1 or 2;

(B) an amount of a catalyst effective to promote bonding of the alkoxysilane compound to a substrate, said catalyst being selected from hydrochloric acid, ammonia water, dilauryl phosphate, or acetyl acetone, and (C) a solvent selected from the group consisting of: alcohols, ketones, hydrocarbons and mixtures of two or more of any of the foregoing.

2. A composition for forming an antifouling layer according to claim 1, wherein said alkoxysilane compound having a perfluoropolyether group expressed by the above general formula (1) has a number-average molecular weight of 500 to 10000.

3. An optical component comprising:
a plastic substrate having a surface;
an outermost inorganic layer disposed on said surface; and
an antifouling film disposed on said outermost inorganic layer, said antifouling film comprising an alkoxysilane compound having a perfluoropolyether group selected from compounds having the formula:

$$R^f(COR^1-R_2-Si(OR^3)_3)_j,$$

wherein $R^f$ is selected from $$F(CF_2CF_2CF_2O)_n-,$$

$$CF_3(OCFCF_2)_m(OCF_2)_l-,$$
$$\ \ \ \ \ \ \ \ \ \ \ |$$
$$\ \ \ \ \ \ \ \ \ \ CF_3$$

$$-F(CFCF_2O)_k-, \text{ or}$$
$$\ \ \ \ \ |$$
$$\ \ \ CF_3$$

$$-(OC_2F_4)_p(OCF_2)_q-,$$

wherein k, l, n, n, p and q are integers of 1 or more; $R^1$ is selected from O, N or S; $R^2$ is selected from divalent alkylene, benzylene or phenylene; and $R^3$ is an alkyl group and j is 1 or 2; and a minor effective amount of a catalyst effective to promote bonding of the alkoxysilane compound to the outermost inorganic layer and substrate, said catalyst being selected from hydrochloric acid, ammonia water, dilauryl phosphate, or acetyl acetone.

4. An optical component according to claim 3, wherein said outermost inorganic layer contains as a main component silicon oxide.

5. An optical component according to claim 3, wherein said plastic substrate is a sheet or film.

6. An optical component according to claim 3, wherein the optical component has an anti-reflection filter including said outermost inorganic layer.

7. An optical component according to claim 6, wherein the anti-reflection filter includes said outermost inorganic layer and a conductive layer.

8. A display device comprising:
a display panel; and
an optical component adhered to said displayed panel, said optical component comprising:
a plastic substrate having a surface;
an outermost inorganic layer disposed on said surface; and
an antifouling film disposed on said outermost inorganic layer, said antifouling film comprising an alkoxysilane compound having a perfluoropolyether group selected from compounds having the formula:

$$R^f(COR_1-R^2-Si(OR^3)_3)_j,$$

wherein $R^f$ is selected from $$F(CF_2CF_2CF_2O)_n-,$$

$$CF_3(OCFCF_2)_m(OCF_2)_l\text{—},$$
$$|$$
$$CF_3$$

$$F(CFCF_2O)_k\text{—, or}$$
$$|$$
$$CF_3$$

$$\text{—}(OC_2F_4)_p(OCF_2)_q\text{-bond,}$$

wherein k, l, m, n, p and q are integers of 1 or more; $R^1$ is selected from O, N or S; $R^2$ is selected from divalent alkylene, benzylene or phenylene; and $R^3$ is an alkyl group and j is 1 or 2; and a minor effective amount of a catalyst effective to promote bonding of the alkoxysilane compound to the outermost inorganic layer and substrate, said catalyst being selected from hydrochloric acid, ammonia water, dilauryl phosphate, or acetyl acetone.

9. A display device according to claim 8, wherein the display device is a cathode-ray tube.

10. A display device according to claim 8, wherein said outermost inorganic layer contains as a main component silicon oxide.

* * * * *